United States Patent [19]

Golinelli et al.

[11] 4,447,960

[45] May 15, 1984

[54] PLUG GAUGE FOR CHECKING DIMENSIONS OF BORES OF MECHANICAL PARTS

[75] Inventors: Guido Golinelli, Bologna; Narciso Selleri, Monteveglio, both of Italy

[73] Assignee: Finike Italiana Marposs S.p.A., S. Marino di Bentivoglio, Italy

[21] Appl. No.: 366,132

[22] Filed: Apr. 6, 1982

[30] Foreign Application Priority Data

Apr. 30, 1981 [IT]  Italy .................................. 3417 A/81

[51] Int. Cl.³ .................................................. G01B 7/12
[52] U.S. Cl. .................................. 33/178 E; 33/147 K; 33/148 H
[58] Field of Search ............. 33/178 R, 178 E, 178 F, 33/147 K, 147 N, 172 E, 148 H

[56] References Cited

U.S. PATENT DOCUMENTS

| | | | |
|---|---|---|---|
| 3,717,934 | 2/1973 | Ishikawa | 33/178 E X |
| 4,030,202 | 6/1977 | Fadl et al. | 33/178 E |
| 4,279,079 | 7/1981 | Gamberini et al. | 33/149 J |
| 4,306,455 | 12/1981 | Selleri | 33/178 E X |

FOREIGN PATENT DOCUMENTS

| | | | |
|---|---|---|---|
| 664927 | 6/1964 | Italy | 33/147 K |
| 1443036 | 7/1976 | United Kingdom . | |

*Primary Examiner*—Harry N. Haroian
*Attorney, Agent, or Firm*—Stevens, Davis, Miller & Mosher

[57] ABSTRACT

Plug gauge for checking the diameter of a bore, including two movable arms with relevant feelers and a protective body defining two holes for the passage of the feelers. A sealing gasket seals the space between the holes of the protective body and the feelers, preventing the entry of foreign matter, such as chips and coolants, into the protective body.

15 Claims, 8 Drawing Figures

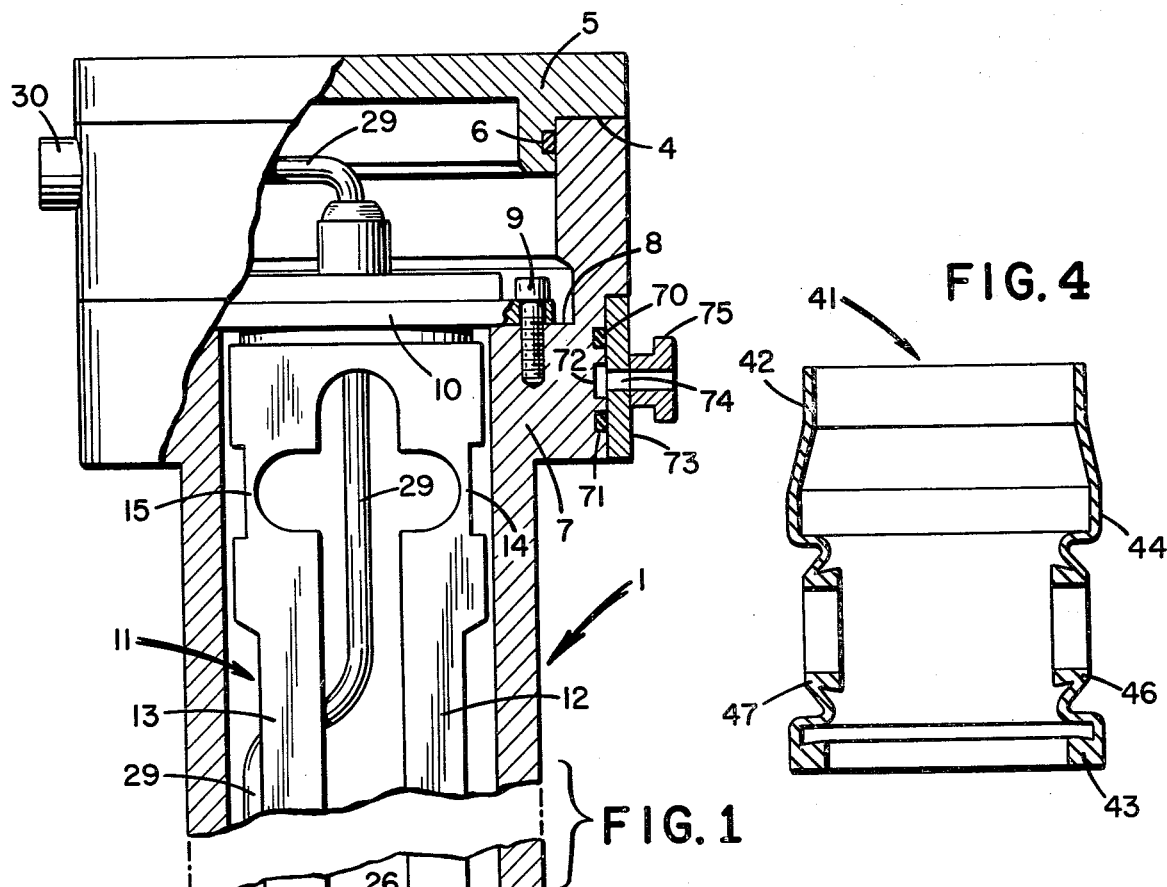
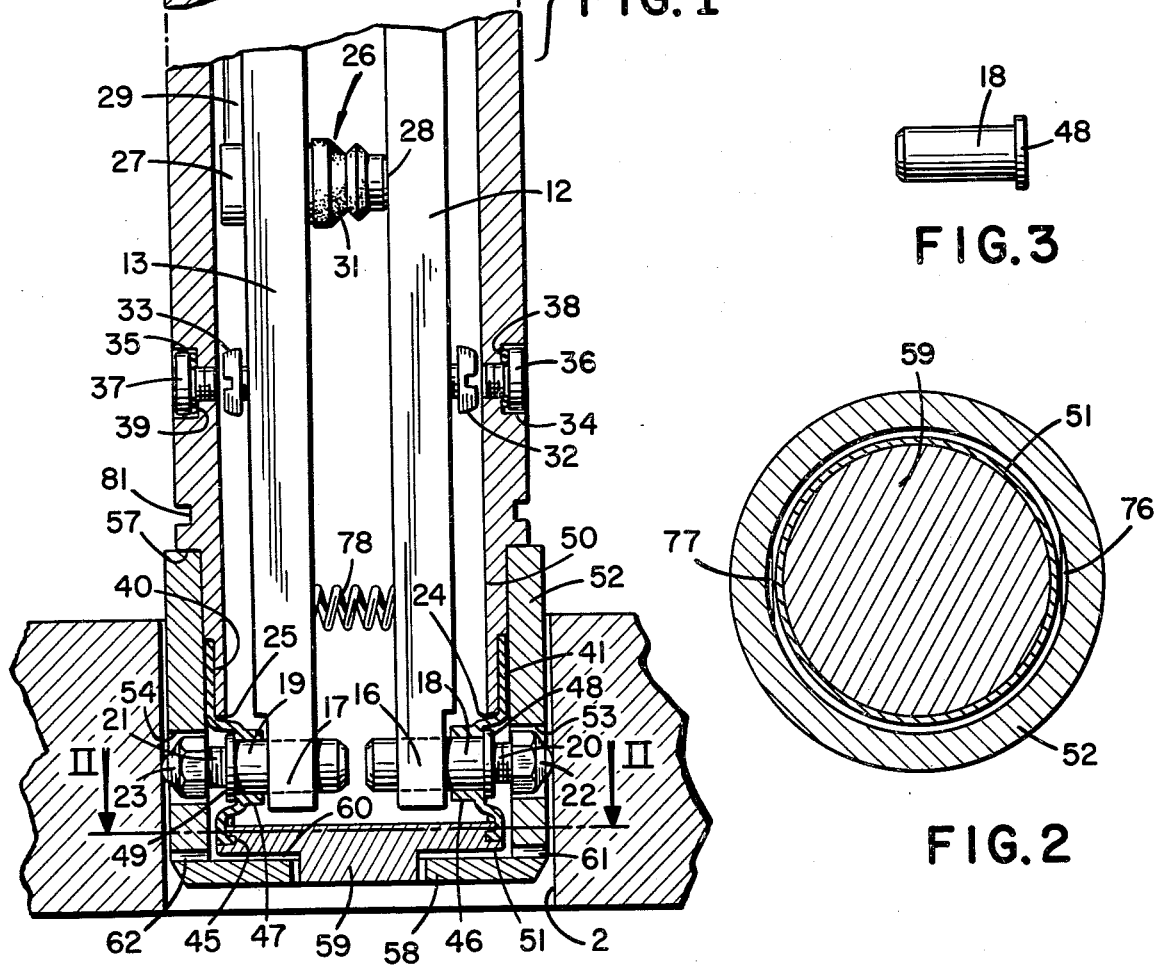

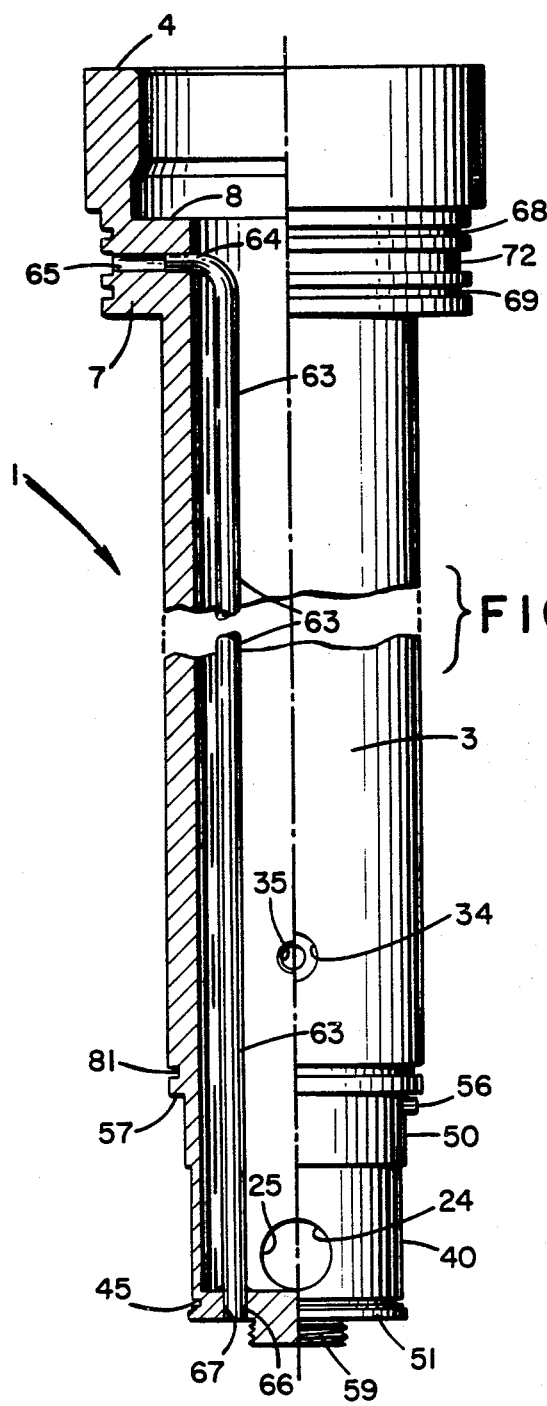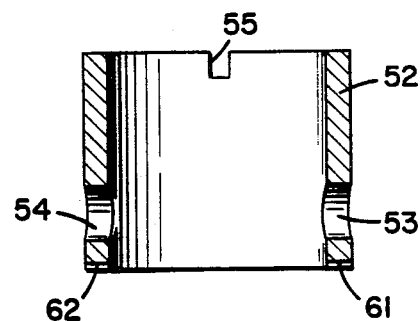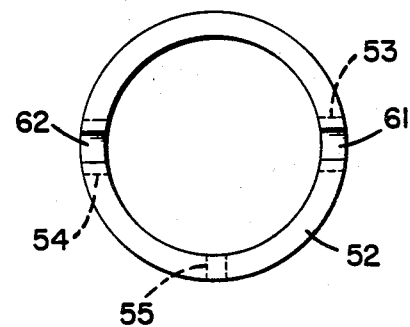

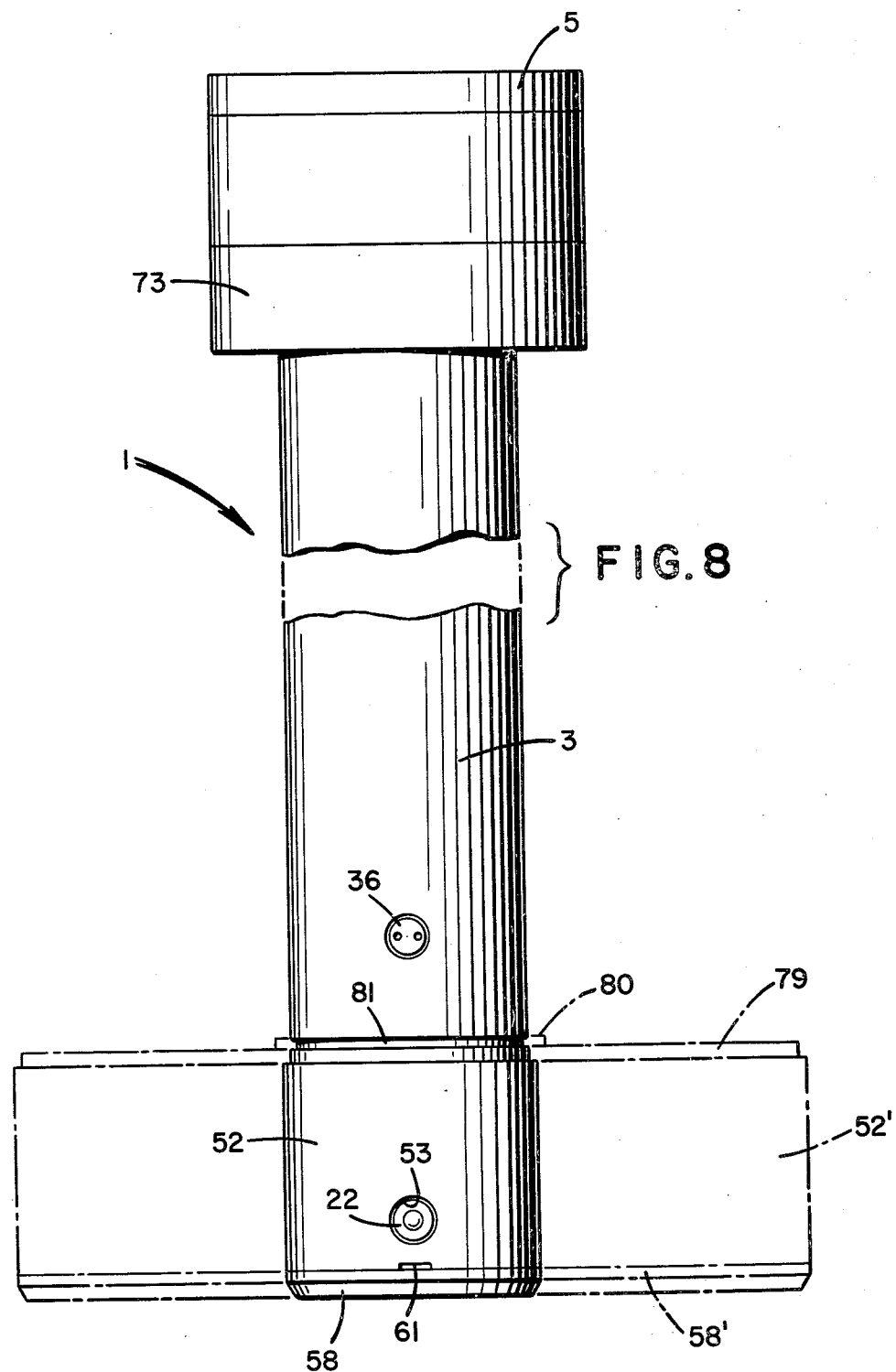

PLUG GAUGE FOR CHECKING DIMENSIONS OF BORES OF MECHANICAL PARTS

The present invention relates to a plug gauge for checking diameters of bores of mechanical parts, with an arm-set including two movable arms, two feelers adapted to touch the surface of a bore to be checked, two connective devices for connecting each feeler to a relevant movable arm and transducer means associated with the movable arms for providing signals indicative of the diameter of the bore, and with a protective device including a hollow nosepiece adapted for entering the bore, the nosepiece having two opposite openings for the passage of the connection devices.

There are known gauges for checking the diameter of bores including an arm-set fixed to a support and having movable feelers, adapted to touch the surface of a bore to be checked. There also is known a nosepiece fixed to the support, that has holes for the passage of the feelers, and substantially serves to protect the arm-set.

The support is clamped to a slide that displaces the gauge to a measuring position from a rest position. In the measuring position the nosepiece enters the bore to be checked and the feelers touch the surface of the bore.

In order to allow the feelers to move freely, some radial play is provided between the holes in the nosepiece and the feelers. When the gauges are in operation, especially in those cases where there are particularly severe working conditions, e.g. for gauges fitted to transfer machines for checking pieces at intermediate phases of the machining cycles, chips—that can have considerable sizes—, coolants or any other foreign matter, can enter into the nosepieces and heap up, so preventing the feelers from moving freely. In these gauges there arizes the need to accomplish periodic cleaning operations involving the dismantling of the nosepieces in order to remove any foreign matter. It is obvious that whenever the gauges check pieces at intermediate machining phases, while the cleaning operation is being carried out it is necessary to stop the machining in order to avoid the production of pieces with out-of-tolerance dimensions.

As a result of the above, it can be easily understood that the cleaning operation is very expensive.

Some constructional features are used in the known gauges, in order to prevent the heaping up of chips and of foreign matter. These features, however, do not provide entirely satisfactory results.

According to a first known constructional feature, preferably used for plug gauges that work in a vertical position, there are foreseen protection nosepieces with large openings through which any chips or other foreign matter can drop off the nosepiece as a result of gravity. According to this feature, however, there is only a partial protection of the arm-set.

According to another conventional technical feature there is applied compressed air that flows through the nosepiece and thus removes any foreign matter making it come out of suitable openings of the nosepiece.

Both these conventional features base themselves on the principle of removing any foreign matter after is has entered inside the nosepiece.

In fact, the use of sealing elements, for example flexible gaskets, applied between nosepieces and feelers, to prevent any foreign matter from entering inside, cannot provide satisfactory results because these gaskets, in order to be sufficiently resistant for a reasonable period of time to possible impacts with particularly sharp chips in the course of machining, should be very rugged and consequently inadequately flexible. This would cause unacceptable consequences on the displacements of the arms and feelers, the contact forces between feelers and pieces to be checked and therefore also on measurement accuracy and repeatability.

The object of the present invention is to provide a plug gauge wherein the entering of any foreign matter towards the gauging arm-set is efficaciously impeded, without affecting the performance and the correct operation of the gauge.

This object is attained through a plug gauge wherein the protective device also includes a hollow body located, at least partially, inside the nosepiece and having two holes in correspondence with the nosepiece openings, the plug gauge further including sealing means arranged inside the nosepiece and adapted to provide sealing between the holes of the hollow body and the connective devices, while allowing the displacements of the connective devices and the feelers.

The invention is now described with reference to the accompanying drawings, given by way of non-limiting example, in which:

FIG. 1 is a partly cross-sectioned view of a plug gauge for checking the diameter of a hole, according to a preferred embodiment of the invention;

FIG. 2 is a cross-sectional view along line II—II of the gauge in FIG. 1;

FIG. 3 shows a bushing of the gauge of FIG. 1;

FIG. 4 shows a sealing gasket used in the gauge of FIG. 1;

FIG. 5 is a simplified, partly-sectioned view of the gauge shown in FIG. 1;

FIG. 6 is a cross-sectional view, according to an axial plane, of the nosepiece of the gauge shown in FIGS. 1 and 5;

FIG. 7 is a plan view of the nosepiece shown in the crosssectional view of FIG. 6; and FIG. 8 is a front view of the gauge shown in FIGS. 1 and 5.

With reference to FIGS. 1, 5 and 8, a plug gauge 1 for checking a diameter of a hole 2 includes a hollow protective 3 outer casing. Casing 3 has a substantially cylindrical shape with sections that have a different diameter and is open at its upper end 4.

A closure cover 5 and an annular flexible gasket 6 (shown in FIG. 1) seal end 4 of casing 3. Cover 5 is fixed to casing 3 by means of screws—not shown; moreover, cover 5 has threaded holes—not shown—to clamp gauge 1 to a slide or to a carrier, of a type already known and consequently not shown, that serves to make gauge 1 enter into hole 2 to be checked.

A portion 7 of casing 3 has an internal shoulder 8 to which a flange 10 of an arm-set 11 is fixed by means of screws 9.

Arm-set 11 is made of a single piece and it includes, apart from the cited flange 10, two substantially prismatic arms 12 and 13, that have longitudinal axes that are substantially parallel to the longitudinal geometrical axis of casing 3. The upper ends 14 and 15 of arms 12 and 13 have thickness considerably smaller than that of the remaining parts, so as to define, in substance, fulcrums with axes that are perpendicular to the longitudinal geometrical axes of arms 12 and 13, about which the arms can accomplish limited rotations.

The lower ends 16 and 17 of arms 12 and 13 have holes into which there are coupled, by interference fit, two cylindrical connective bushings 18 and 19. The cylindrical bushings 18 and 19 are internally threaded to house in an adjustable way threaded connective stems 20 and 21 of feelers 22 and 23. Feelers 22 and 23 have spheric caps of a material resistant to wear, for example an industrial diamond, adapted to touch the surface of hole 2.

In correspondence to feelers 22 and 23, external casing 3 has radial holes 24 and 25 for the passage of feelers 22 and 23.

A position transducer 26 of the inductive type has two parts 27 and 28 that are reciprocally movable, fixed to arms 12 and 13 in an intermediate position between ends 14, 15 and 16, 17. Part 27 contains the windings of a differential transformer and a first part of a magnetic circuit associated with the windings, part 28 includes a magnetic core that forms a second part of the magnetic circuit. Transducer 26 is connected, by means of a cable 29, to a terminal board 30, by means of which transducer 26 can be connected to a power supply, processing and display unit, already known and consequently not shown.

Transducer 26 is sealed. The transducers sealing may be achieved in many ways among which is by coupling a bellows gasket 31 to parts 27 and 28. Two screws 32 and 33, screwed in threaded holes of arms 12 and 13, can abut against the internal surface of casing 3, to limit the maximum opening of arms 12 and 13.

The position of screws 32 and 33 can be adjusted through two openings 34 and 35 of casing 3 sealed by means of threaded caps 36 and 37 and gaskets 38 and 39.

The end of outer casing 3 adjacent to holes 24 and 25 has a cylindrical portion 40 on which there is placed a flexible sealing gasket 41. Flexible gasket 41 (shown in FIG. 4) has a tubular shape with a first end 42 resiliently coupled to cylindrical portion 40, a second end that has an annular portion 43, with an axial semi-section that substantially has the shape of a rectangular trapezium and an intermediate portion 44 that houses portion 40 without tightening it.

Annular portion 43 is inserted in a groove 45 of portion 40; the axial semisection of groove 45 has a shape corresponding to that of annular portion 43, so as to bind the annular section 43 in an axial direction with respect to casing 3. The intermediate section 44 of gasket 41 is resiliently yielding and defines annular protruding parts 46 and 47 resiliently coupled to end portions of bushings 18 and 19. Bushings 18 and 19 have two annular projecting parts 48 and 49 that, by cooperating with the annular projecting parts 46 and 47, prevent the latter from accidentally slipping off.

The annular protruding parts 46 and 47 are arranged mostly inside casing 3, through holes 24 and 25. Holes 24 and 25 are sufficiently large to allow the two annular projecting parts 46 and 47 to be easily inserted on relevant bushings 18 and 19 after arm-set 11 has been clamped to casing 3.

When gasket 41 has been correctly applied, it seals holes 24 and 25 of casing 3 and, owing to the intermediate section 44—that is resiliently yieldable—, it does not oppose in an appreciable way to the movements of feelers 22 and 23 and of arms 12 and 13.

Portion 40 is delimited by two substantially cylindrical portions 50 and 51 (shown in FIGS. 1, 2 and 5), of the same diameter, on which there is keyed a tubular nosepiece 52 (shown in FIGS. 2, 6 and 7). The diameter of the cylindrical portions 50 and 51 is greater than that of portion 43. Nosepiece 52 is used, among the other things, for centering the plug gauge 1 with respect to a master ring (not shown) by means of which one accomplishes the zero setting of gauge 1 with respect to a diameter of a known value.

Nosepiece 52 has two holes 53 and 54, aligned with holes 24, 25, for the passage, with some radial play, of feelers 22 and 23 and of associated stems 20 and 21, and a reference groove 55 for housing a reference lug 56 of cylindrical portion 50, in order to keep nose-piece 52 in a prefixed angular position. Nosepiece 52 has an upper base in abutment with a shoulder 57 of casing 3. A plate 58, screwed to a threaded boss 59 of casing 3, abuts against the lower base of nosepiece 52. The length of nosepiece 52, along its axial direction, is greater than the distance separating shoulder 57 and the end of casing 3 adjacent to the threaded boss 59, so that when plate 58 abuts against the lower base of nosepiece 52, between plate 58 and the end of casing 3 adjacent to threaded boss 59 there remains an air space 60, whose function will be explained hereinafter.

In correspondence with the air space 60, the lower base of nosepiece 52 also has two radial through grooves 61 and 62.

When nosepiece 52 is clamped to outer casing 3, it houses on its interior gasket 41 in such a way that there is radial matching play between the internal surface of nosepiece 52 and gasket 41, so that the intermediate portion 44 can freely bend. Consequently, the function of nosepiece 52, is also that of a mechanical protection for gasket 41. A small tube 63 (FIG. 5) is arranged lengthwise in casing 3 and it has a first end 64 inserted in a radial hole 65 made in portion 7 and the other end 66 inserted in a hole 67 located at the end of casing 3 that is adjacent to threaded boss 59. Tube 63 is glued, or welded, to casing 3.

Portion 7 has two annular grooves 68 and 69, wherein there are arranged sealing rings 70 and 71 and a groove 72—that lies between grooves 68 and 69—into which the radial hole 65 comes out. Portion 7 is encompassed by a ring 73 that has a hole 74, communicating with groove 72, and a flange 75 by means of which ring 73 can be connected to a pipe, not shown, fed with compressed air. Ring 73, grooves 68, 69 and 72 and sealing rings 70 and 71 define a rotatable manifold that allows the connection of gauge 1 to the formerly mentioned pipe fed with compressed air, in any radial position. Clamping means, not shown, allow clamping ring 73 in a desired radial position.

When flange 75 is connected to the formerly mentioned air pipe, the compressed air can flow through groove 72, small tube 63, and air space 60. Part of the air that reaches air space 60 can flow through the radial grooves 61 and 62 of nosepiece 52 and part flows upwards, through two openings 76 and 77 (FIG. 2) defined between nosepiece 52 and portion 51. Openings 76 and 77 are formed by flat bevels made on limited areas of portion 51 of casing 3. The air that flows through openings 76 and 77 can thereafter flow out of nosepiece 52 through the space between feelers 22, 23 and holes 53 and 54 of nosepiece 52.

A spring 78, that has its ends fixed to arms 12 and 13, substantially defines the contact force of the spheric caps of feelers 22 and 23 against the surface of hole 2.

Gauge 1 works in the following way.

When gauge 1 is moved towards the piece to be checked and nosepiece 52 is entered into hole 2, the compressed air, that flows through the radial grooves 61 and 62, cleans for a first time the areas that are around the two generating lines of hole 2—which are touched by the spheric caps of feelers 22 and 23—and thus removes chips and other possible foreign matter.

When the spheric caps of feelers 22 and 23 touch the surface of hole 2, the air that flows out of holes 53 and 54 opposes the entering of any chips and foreign matter—not removed by the air that flows from the radial grooves 61 and 62—inside gauge 1. If, in spite of the action of the jets of compressed air, small chips and foreign matter pass through the limited amount of space between holes 53, 54 and feelers 22, 23, gasket 41 prevents these particles from entering inside casing 3 and hampering the movement of arms 12 and 13.

When gauge 1 is moved away from hole 2, that has already been checked, any possible chips or foreign matter, that may have deposited in the space between feelers 22, 23 and holes 53, 54, is removed by the compressed air. If any chip remains it can be manually removed. In the very unlikely case that gasket 41 gets damaged, it can be replaced. The substitution of this gasket is an extremely simple and quick operation and therefore is unexpensive.

When the spheric caps of feelers 22 and 23 touch the surface of hole 2 they have moved radially thereby determining a rotation of arms 12 and 13 about the fulcrums defined by ends 14 and 15. The mutual position of the two arms 12 and 13 is detected by transducer 26 which provides an electrical signal representative of the deviation of the diameter of hole 2 from the known value at which gauge 1 had been zero-set.

As gasket 41 is protected in an efficient way, owing to the fact that a considerable part of it faces the internal surface of nosepiece 52 and owing to the limited space existing between the surfaces of holes 53, 54 and feelers 22, 23, it can be manufactured in such a way that the intermediate portion 44 is very yieldable. Consequently gasket 41 does not hamper in any appreciable way the displacements of arms 12 and 13 and does not determine any appreciable variation of the contact forces exchanged between feelers 22 and 23 and the surface of hole 2.

Gauge 1 can easily be retooled for checking holes of different nominal diameter from that of hole 2. To this purpose it is sufficient to remove plate 58 and nosepiece 52 and replace them with a nosepiece 52' and a plate 58' (FIG. 8) of a suitable diameter and replace feelers 22 and 23 with others that have threaded stems of a suitable length. The skirt of nosepieces 52' for checking holes that have a diameter that is considerably greater than that of nosepiece 52, shown in FIG. 1, is hollow and it has a substantially U-shaped axial semisection. A plate 79, keyed to portion 50, closes the open end of the U in order to prevent the nosepiece from filling up with chips and other foreign matter. Plate 79 is kept into position by means of a resilient ring 80 that is inserted in a groove 81 of casing 3.

It will of course be realized that many modifications of constructional detail and design can be made to the aforedescribed and illustrated gauge without departing from the scope of the invention; e.g. it is possible to manufacture gauges that have a number of feelers other than two. In this case the resilient gasket 41 should have an adequate number of protruding parts like 46, 47 and nosepiece 52 should have an adequate number of holes like 53 and 54 for the passage of the feelers and radial grooves for the passage of the air for cleaning the hole to be checked.

What is claimed is:

1. A plug gauge according to claim 1, wherein said sealing means include at least for checking diameters of bores of mechanical parts, comprising an arm-set, the arm-set including two movable arms, two feelers adapted to touch the surface of a bore to be checked, two connective devices for connecting each feeler to a relevant movable arm, and transducer means associated with the movable arms for providing signals indicative of the diameter of the bore; and a protective device including a hollow nosepiece adapted for entering the bore, the nosepiece having two opposite openings for the passage of the connective devices, a hollow casing located, at least partially, inside the nosepiece and having two holes in correspondence with the nosepiece openings; and a gasket having first portions coupled to the hollow casing, second portions fixed to the connective devices, and third resilient portions connecting the first and the second portions, the gasket being arranged inside the nosepiece and adapted to provide sealing between the holes of the hollow casing and the connective devices, while allowing the displacements of the connective devices and the feelers.

2. The plug gauge according to claim 1, wherein said gasket has a substantially tubular shape and has two ends defining said first portions and a central part that defines said second portions, the central part having two holes for the passage of the connective devices.

3. The plug gauge according to claim 1, further comprising pipes for causing a flow of a compressed fluid in correspondence with the gasket and for making the fluid flow out from the inside to the outside of the plug gauge.

4. The plug gauge according to claim 3, wherein said pipes are adapted to make the fluid flow, at least partially, through a space delimited by the surfaces of the openings of the nosepiece, the connective devices and the feelers, in order to prevent the entering of any foreign matter inside the plug gauge through said space.

5. The plug gauge according to claim 4, wherein the pipes include openings to direct the fluid towards a part to be checked when the plug gauge cooperates with the part, in order to clean the surface of the bore to be checked.

6. The plug gauge according to claim 5, further including a plate adapted to cooperate with the hollow casing and the nosepiece, said pipes being fed with compressed air, a manifold for connecting to a source of compressed air external to the plug gauge, a tube arranged longitudinally inside the hollow casing, and air spaces located between an internal surface of the nosepiece, the hollow casing and the plate.

7. The plug gauge according to claim 6, wherein the air spaces include an air space between said gasket, the internal surface of the nosepiece, and any outer surface of the hollow casing.

8. The plug gauge according to claim 7 wherein the nosepiece includes further radial openings for the passage of said fluid for cleaning the surface of the bore to be checked.

9. The plug gauge according to claim 6, wherein the manifold is adapted to allow the connection to a source of compressed air in any radial position with respect to the plug gauge.

10. The plug gauge according to claim 2, wherein said first portions cooperate with an external surface of the hollow casing and face an internal surface of the nosepiece.

11. The plug gauge according to claim 2, wherein the nosepiece has a substantially tubular shape and defines a reference surface and the hollow casing includes a reference element, adapted to cooperate with the reference surface of the nosepiece for the angular mutual positioning of the nosepiece and the casing, the casing moreover including an axial abutment surface adapted to cooperate with a first base of the nosepiece, the gauge further including a base plate adapted to cooperate with an end of the hollow casing and with a second base of the nosepiece.

12. The plug gauge according to claim 10, wherein between the internal surface of the nosepiece and the gasket there is radial matching play.

13. The plug gauge according to claim 10, wherein the connective devices include cylindrical bushings, fixed to the arms, adapted to cooperate with the surface of the holes of the central part of the gasket, the bushings including annular projecting parts coupled with the second portions of the gasket, the second portions having a substantially annular shape.

14. A plug gauge for checking diameters of bores of mechanical parts, comprising:
   a substantially cylindrical, hollow casing having two diametrally opposed holes;
   an armset supported by the casing and including: two movable arms arranged within the casing, substantially along the longitudinal direction thereof; two connective devices coupled at relevant ends of the movable arms; two feelers respectively fixed to the connective devices for displacements substantially along a diametral direction of the hollow casing for touching the surface of a bore to be checked; and transducer means coupled to the movable arms for providing a signal indicative of the diameter of the bore;
   a nosepiece adapted for entering the bore, the nosepiece being coupled to the hollow casing and encircling a portion of the hollow casing with an open space therebetween; the nosepiece having two holes aligned with the holes of the hollow casing for housing the connective devices while permitting their displacements; and
   resilient gasket means partially arranged in said open space intermediate the casing and the nosepiece, the gasket means having first end portions coupled respectively to the hollow casing, second intermediate portions including two annular portions coupled respectively to the connective devices, and third portions connecting the second portions to the first portions, the gasket means providing sealing between said holes of the casing and the connective devices, while allowing said displacements of the connective devices and the feelers.

15. A plug gauge for checking diameters of bores of mechanical parts, comprising:
   a substantially cylindrical, hollow casing having two diametrally opposed holes;
   an armset supported by the casing and including: two movable arms arranged within the casing, substantially along the longitudinal direction thereof; two connective devices coupled at relevant ends of the movable arms; two feelers respectively fixed to the connective devices for displacements substantially along a diametral direction of the hollow casing for touching the surface of a bore to be checked; and transducer means coupled to the movable arms for providing a signal indicative of the diameter of the bore;
   a nosepiece adapted for entering the bore, the nosepiece being coupled to the hollow casing and encircling a portion of the hollow casing with an open space therebetween; the nosepiece having two holes aligned with the holes of the hollow casing for housing the connective devices while permitting their displacements; and
   a substantially tubular resilient gasket having first end portions coupled respectively to the hollow casing at opposite sides with respect to the holes of the hollow casing, a second intermediate portion defining two annular parts respectively fixed to the connective devices, and third portions connecting the second portion to the first portions, the first and third portions being located in the open space intermediate the casing and the nosepiece, the gasket providing sealing between said holes of the casing and the connective devices, while allowing said displacements of the connective devices and the feelers.

* * * * *

UNITED STATES PATENT AND TRADEMARK OFFICE
CERTIFICATE OF CORRECTION

PATENT NO. : 4,447,960
DATED : May 15, 1984
INVENTOR(S) : Guido GOLINELLI and Narciso SELLERI It is certified that error appears in the above—identified patent and that said Letters Patent is hereby corrected as shown below:

Column 1, line 62, "is" should be --it--.
Column 2, line 44, "3 outer casing." should be --outer casing 3.--.
Column 3, line 23, "The transducers sealing" should be --The transducer's sealing--.
Column 4, line 9, "nose-piece" should be --nosepiece--.
Column 5, line 43, --a-- should be inserted before "different".
Claim 1, lines 1 and 2, "according to claim 1, wherein said sealing means include at least" should be cancelled.

Signed and Sealed this

Sixteenth Day of October 1984

[SEAL]

Attest:

Attesting Officer

GERALD J. MOSSINGHOFF

Commissioner of Patents and Trademarks